US012571741B2

(12) United States Patent
Jia et al.

(10) Patent No.: US 12,571,741 B2
(45) Date of Patent: Mar. 10, 2026

(54) RAPID REAL-TIME VISUALIZATION METHOD AND SYSTEM FOR CRACK INITIATION PROCESS OF CONCRETE COMPONENT

(71) Applicant: Nanjing Hydraulic Research Institute, Nanjing (CN)

(72) Inventors: Yu Jia, Nanjing (CN); Lei Tang, Nanjing (CN); Chengqiang Wang, Nanjing (CN); Yukun Wang, Nanjing (CN); Hao Li, Nanjing (CN); Pengfei Zhu, Nanjing (CN); Yulei Wang, Nanjing (CN)

(73) Assignee: Nanjing Hydraulic Research Institute, Nanjing (CN)

( * ) Notice: Subject to any disclaimer, the term of this patent is extended or adjusted under 35 U.S.C. 154(b) by 188 days.

(21) Appl. No.: 18/679,382

(22) Filed: May 30, 2024

(65) Prior Publication Data

US 2024/0426767 A1      Dec. 26, 2024

(30) Foreign Application Priority Data

Jun. 26, 2023      (CN) .......................... 202310763105.1

(51) Int. Cl.
| | |
|---|---|
| *G01N 21/95* | (2006.01) |
| *G01N 21/64* | (2006.01) |
| *G01N 21/88* | (2006.01) |
| *G01N 3/06* | (2006.01) |
| *G01N 21/91* | (2006.01) |

(52) U.S. Cl.
CPC ..... *G01N 21/9515* (2013.01); *G01N 21/6456* (2013.01); *G01N 21/8806* (2013.01); *G01N 3/068* (2013.01); *G01N 2021/646* (2013.01); *G01N 21/91* (2013.01)

(58) Field of Classification Search
USPC .......................................................... 702/40
See application file for complete search history.

(56) References Cited

U.S. PATENT DOCUMENTS

| | | | | |
|---|---|---|---|---|
| 6,195,891 | B1 * | 3/2001 | Chen ...................... | G01N 21/91 |
| | | | | 29/889.7 |
| 11,788,964 | B1 * | 10/2023 | Burke .................... | G01N 21/91 |
| | | | | 250/459.1 |

(Continued)

*Primary Examiner* — Paul D Lee

(57) ABSTRACT

A rapid real-time visualization system for a crack initiation process of a concrete component includes a pressure test machine, a fluorescent solution spraying device, an ultraviolet lamp group, a visible light imaging device group and a computer control system. Before the concrete component cracks, a surface of the concrete component is coated with a fluorescent solution retention layer to separate the sprayed fluorescent excitation solution from the concrete component, making the fluorescent excitation solution adhere to the fluorescent solution retention layer for a long time to mark cracks at any position in real time. The rapid real-time visualization system is used to achieve visualization of the crack initiation process, especially an early stage thereof. The rapid real-time visualization system and method can be used to study patterns of microcrack mutual traction development and aggregation into groups when concrete materials crack at any position or multiple points at a component scale.

9 Claims, 5 Drawing Sheets

(56) References Cited

U.S. PATENT DOCUMENTS

| | | | | |
|---|---|---|---|---|
| 2006/0154046 | A1* | 7/2006 | Takahashi | G01N 21/91 |
| | | | | 428/323 |
| 2009/0093361 | A1* | 4/2009 | Sakatani | B01J 37/0219 |
| | | | | 502/309 |
| 2009/0262331 | A1* | 10/2009 | Burchardt | G01M 5/0091 |
| | | | | 385/12 |
| 2011/0267454 | A1* | 11/2011 | Henrikson | G01N 21/91 |
| | | | | 348/131 |
| 2013/0088707 | A1* | 4/2013 | Imani | G01N 21/954 |
| | | | | 356/237.2 |
| 2016/0202465 | A1* | 7/2016 | Sase | G01N 21/6458 |
| | | | | 382/164 |

* cited by examiner

RAPID REAL-TIME VISUALIZATION METHOD AND SYSTEM FOR CRACK INITIATION PROCESS OF CONCRETE COMPONENT

CROSS-REFERENCE TO RELATED APPLICATION

This application claims priority to Chinese Patent Application No. CN202310763105.1, filed Jun. 26, 2023, which is herein incorporated by reference in its entirety.

TECHNICAL FIELD

The disclosure relates to the field of physical testing technologies for concrete material properties, and more particularly to a rapid real-time visualization method and system for a crack initiation process of a concrete component.

BACKGROUND

The suddenness of fractures is a main cause of engineering accidents, and avoiding the sudden fractures is a key to prevent accidents. In the past half century, the experimental techniques of fracture mechanics have developed rapidly, such as acoustic emission (AE) technology, digital image correlation (DIC) technology, ultrasonic excitation infrared thermal imaging technology, fluorescence excitation technology, and other solid medium microcrack detection technologies, which have been widely studied.

The AE technology is mainly applied in the research of locating and identifying a crack initiation point during a material fracture process. The AE technology calculates and analyzes the position of the crack initiation point based on the received acoustic energy, making it difficult to visually track an entire process of crack initiation and propagation in real time. In addition, the AE technology is commonly used to monitor the initiation and propagation of one crack. For multi crack initiation in reinforced concrete components, the acoustic energy signal collected by the receiver is prone to interference from inclusions and inaccurate positioning.

The DIC technology is a measurement method that performs calculations to obtain full-field displacement information by performing correlation computations on speckle patterns before and after deformation of a component (under the influence of load). The DIC technology needs to firstly determine an observation area before monitoring, and then spray high-density speckle pattern. The observation area is usually small, due to the complexity of spraying work. For free fractures in areas where the crack initiation is unknown in advance (i.e., unpredictable), it is difficult to accurately arrange the observation area, which means it is difficult to monitor the cracking process at the component scale without preset cracks.

The ultrasonic excitation infrared thermal imaging technology detects concrete microcracks and their growth process through ultrasonic thermal excitation and infrared thermal imaging. The ultrasonic transducer will generate a certain amount of heat and radiate into the component due to a continuous excitation of the ultrasonic transducer for a certain period of time, which may interfere with the temperature field of the microcracks.

The fluorescence excitation technology utilizes the unique capillary adsorption effect to cracks, especially microcracks, to induce fluorescence solution on the surface of an excited object to migrate into a crack cavity. By redistributing the fluorescence excitation solution on the surface of the excited object, the method of highlighting microcracks is achieved. At present, the fluorescence excitation technology can just detect existing cracks due to a fact that the excited object generally absorbs the fluorescence excitation solution quickly and has a short development time. Due to a short duration of the current fluorescence effect, there is a lag in real-time tracking of the crack propagation, especially the development of multiple cracks, and the characterization of the propagation process is easily overlooked.

SUMMARY

In response to above problems in the related art, the disclosure provides a rapid real-time visualization method and system for a crack initiation process of a concrete component. The rapid real-time visualization method can detect a crack initiation process and a development process of multiple cracks at any site at a component scale, achieve a location of a cracking position and a real-time visualization of a mutual traction and development process of the multiple cracks, a minimum width of cracks identified reaches 0.017 millimeters (mm).

In a first aspect, the disclosure provides the rapid real-time visualization system for the crack initiation process of the concrete component, including: a pressure test machine, a fluorescent solution spraying device, an ultraviolet (UV) lamp group, a visible light imaging device group, and a computer control system.

The fluorescent solution spraying device is configured to spray fluorescent excitation solution evenly to an observation surface of the concrete component.

The pressure test machine is configured to apply a pressure load to the concrete component to crack the concrete component.

The UV lamp group is configured to project UV lights onto the observation surface of the concrete component, and the UV lights projected by respective UV lamps of the UV lamp group fully cover the observation surface of the concrete component.

The visible light imaging device group is configured to record a development process of cracks marked by the fluorescent excitation solution on the observation surface of the concrete component.

The computer control system is connected to the fluorescent solution spraying device, the UV lamp group, and the visible light imaging device group. The computer control system is configured to control turning-on and turning-off of the fluorescent solution spraying device, the UV lamp group, and the visible light imaging device group, serve as a human-computer interaction interface to splice fields of view of respective visible light imaging devices of the visible light imaging device group into a whole, and visually display a crack initiation process of the cracks marked by the fluorescent excitation solution on the observation surface of the concrete component.

In a second aspect, the disclosure provides the rapid real-time visualization method for the crack initiation process of the concrete component, including following steps.

S1, the concrete component is selected as a research carrier for a crack initiation process test based on a research purpose, the concrete component is placed into the pressure test machine, and a cracking load of the concrete component is estimated.

S2, the observation surface of the concrete component in the crack initiation process of the concrete component is determined, and a fluorescent solution retention layer is evenly coated to the observation surface to make the observation surface of the concrete component wetted.

S3, the computer control system activates the fluorescent solution spraying device to spray the fluorescent excitation solution to the fluorescent solution retention layer until the fluorescent excitation solution adheres evenly to the fluorescent solution retention layer and reaches a critical state where the fluorescent excitation solution is about to flow vertically along the fluorescent solution retention layer.

S4, the computer control system activates the UV lamp group to project the UV lights onto the observation surface of the concrete component to make the UV lights fully cover the observation surface of the concrete component.

S5, the pressure test machine is activated to apply the pressure load to the concrete component, and simultaneously, the computer control system activates the visible light imaging device group to record a video of a crack initiation process on the observation surface of the concrete component.

S6, a monitor of the computer control system monitors the crack initiation process on the observation surface of the concrete component, and the computer control system automatically outlines a microcrack on the monitor for manual confirmation and emits an alert sound, when the microcrack meets microcrack determination criteria in crack propagation.

S7, the computer control system activates the fluorescent solution spraying device to perform supplemental spraying to a tip of the microcrack along a crack propagation direction of the microcrack after manually confirming the microcrack, and perform intermittent supplementary spraying to an area on the observation surface where the supplemental spraying is not performed from an end of the spraying in the step S3.

S8, the step S6 and S7 are repeated during a load applied process to the concrete component until the crack initiation process of the concrete component is completed, the computer control system turns off the visible light imaging device group and the UV lamp group, and a visual analysis and detection of the crack initiation process are achieved by reviewing the video.

In an embodiment, the fluorescent solution retention layer is configured to separate the fluorescent excitation solution from the concrete component, a thickness of the fluorescent solution retention layer is not greater than 0.002 mm, allowing the fluorescent excitation solution to adhere to the fluorescent solution retention layer over 300 seconds, and the fluorescent solution retention layer is capable of cracking synchronously with the cracks on the observation surface without covering the cracks when an initial crack width is in a range of 0.01 mm-0.02 mm, and a material of the fluorescent solution retention layer includes fast-drying rust preventive oil.

In an embodiment, in the step S3, the fluorescent excitation solution is obtained by mixing potassium carbonate, a water-soluble fluorescent yellow reagent, and distilled water, a weight ratio of the potassium carbonate:the water-soluble fluorescent yellow reagent:the distilled water is 75-95:100:0.4-0.7.

In an embodiment, in the step S4, a wavelength of each UV light is 365 nanometers (nm), a density of the UV lights projected to the observation surface of the concrete component is in a range of 2000 microwatts per square centimeter ($\mu w/cm^2$) to 8000 $\mu w/cm^2$. The UV lamp group is selected to project the UV lights, for each UV lamp of the UV lamp group with a rated power of 60 watts (W), a distance from each UV lamp to the concrete component is in a range of 0.5 m-1.0 meters (m), and a distance between each UV lamp is not greater than 300 mm.

In an embodiment, in the step S5, in the load applied process to the concrete component, when the pressure load is applied to 80% of an estimated cracking load, a loading displacement rate is reduced to 0.02-0.1 millimeters per minute (mm/min).

In an embodiment, in the step S5, the visible light imaging device group is located at a distance of 1.0-1.5 m from the observation surface of the concrete component, an observation length of the concrete component in the field of view of each visible light imaging device of the visible light imaging device group is not greater than 1 m, the visible light imaging devices are arranged at equal intervals, a combination of the fields of view of the visible light imaging devices exactly covers the concrete component, and a length of the concrete component in the field of view of each visible light imaging device is same.

In an embodiment, the visible light imaging device group includes a high-speed camera and a high-definition camera, the high-speed camera is configured to meticulously research the concrete component when the crack initiation process develops rapidly, a resolution of the high-speed camera is not less than 4 million pixels, a shooting speed of the high-speed camera is not less than 1440 frames per second, the high-definition camera is configured to research the concrete component when the crack initiation process develops slowly under a controlled loading rate, and a resolution of the high-definition camera is not less than 10 million pixels.

In an embodiment, the microcrack should simultaneously meet the microcrack determination criteria including a first criterion (1) and a second criterion (2), or the first criterion (1) and a third criterion (3). The first criterion (1) is that a dark band appears around the microcrack on the observation surface because the microcrack absorbs the fluorescent excitation solution, and an adsorption effect of the microcrack on the fluorescent excitation solution is enhanced, resulting in the dark band wider than 1.5 mm, due to a lubricating effect of the fluorescent solution retention layer on the observation surface, the second criterion (2) is that a crack-shaped dark band first appears on a tensile side of the concrete component and then extends towards a compressive side of the concrete component, the third criterion (3) is that there is a crack-shaped dark band perpendicular to a compression direction of the concrete component, due to mutual attractions during the development process of the cracks and a situation where the cracks interconnect and develop with each other.

In an embodiment, in the step S7, a time interval of the intermittent supplementary spraying is in a range of 10-15 minutes.

The disclosure has below beneficial effects.

(1) In the disclosure, before the microcrack appears on the concrete component, the fluorescent solution retention layer is coated to the observation surface of the concrete component, the fluorescent solution retention layer is used to separate the fluorescent excitation solution from the concrete component, based on the fluorescent solution retention layer, the fluorescent excitation solution can adhere to the observation surface of the concrete component for a long time and converge into a microcrack cavity more conveniently. The fluorescent solution retention layer cracks synchronously with the cracks of the concrete component, and a visual display of the crack initiation process, especially an early stage of the crack initiation process, can be achieved by pre-attaching of the fluorescent excitation solution to a whole of the observation surface of the concrete component.

(2) The disclosure can be used to study patterns of microcracks mutual traction development and aggregation into groups when concrete materials crack at any position or multiple points at the component scale. The minimum width of the cracks identified reaches 0.017 mm.

(3) The disclosure provides the rapid real-time visualization system for the crack initiation process of the concrete component, including the pressure test machine, the fluorescent solution spraying device, the UV lamp group, the visible light imaging device group, and the computer control system. The fluorescent solution spraying device, the UV lamp group, the visible light imaging device group are all connected to the computer control system. By using the rapid real-time visualization system not only achieves simply coating of the fluorescent solution retention layer and spraying of the fluorescent excitation solution, but also simultaneously achieve a highly efficient and fast visualization of the crack initiation process by controlling fluorescence excitation, UV light radiation, and visible light imaging monitoring through the computer control system.

BRIEF DESCRIPTION OF DRAWINGS

To clearly explain technical solutions of embodiments of the disclosure, accompanying drawings in the embodiments of the disclosure are simply introduces below. Apparently, the accompanying drawings described below are only some embodiments of the disclosure, for those skilled in the art, other drawings can be obtained according to the accompanying drawings without creative labor.

DETAILED DESCRIPTION OF EMBODIMENTS

In the following description, specific details such as specific system structures and techniques etc., are proposed for a purpose of illustration rather than limitation, in order to thoroughly understand the embodiments of the disclosure. However, those skilled in the art should be aware that the disclosure can also be implemented in other embodiments without these specific details. In other cases, detailed descriptions of well-known systems, devices, circuits, and methods are omitted to avoid unnecessary details hindering the description of the disclosure.

Based on a fact that current concretes can absorb fluorescent excitation solution (with a short development time) and cannot track a cracking process, especially a development process of multiple cracks in real-time, the disclosure coats a fluorescent solution retention layer on an observation surface of a concrete component, before the observation surface starts cracking (i.e., before microcracks appear on the observation surface), and a function of the fluorescent solution retention layer is to separate the fluorescent excitation solution from the concrete component. The fluorescent excitation solution is sprayed after spraying the fluorescent solution retention layer in order that the fluorescent excitation solution can stay on the observation surface for a long time, the long stay is used to research and explore an entire crack propagation process and track the entire crack propagation process in real-time.

Embodiment 1

Figure 13:
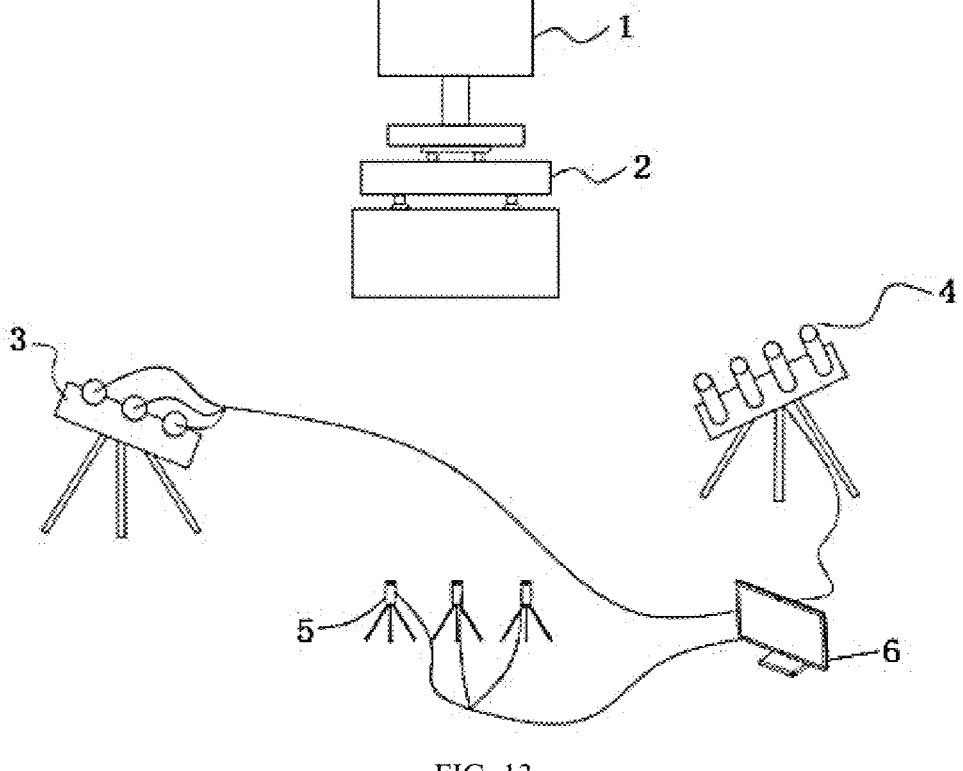
FIG. 13 illustrates a schematic diagram of a rapid real-time visualization system for a crack initiation process of a concrete component.

Referring to FIG. 13, this embodiment of the disclosure provides a rapid real-time visualization system for a crack initiation process of the concrete component 2. The rapid real-time visualization system includes: a pressure test machine 1, a fluorescent solution spraying device 3, an UV lamp group 4, a visible light imaging device group 5, and a computer control system 6. The fluorescent solution spraying device 3 is configured to spray the fluorescent excitation solution to the observation surface of the concrete component 2. The pressure test machine 1 is configured to apply a pressure load to the concrete component 2 to crack the concrete component 2. The UV lamp group 4 is configured to project UV lights onto the observation surface of the concrete component 2, and the UV lights projected by respective UV lamps of the UV lamp group 4 fully cover the observation surface of the concrete component 2. The visible light imaging device group 5 is configured to record a development process of cracks marked by the fluorescent excitation solution on the observation surface of the concrete component 2, and the visible light imaging device group 5 includes a high-speed camera (with a resolution no less than 4 million pixels and a shooting speed no less than 1440 frames per second) and a high-definition camera (with a resolution no less than 10 million pixels). The high-speed camera is configured to meticulously research the concrete component 2 when the crack initiation process develops rapidly, and the high-definition camera is configured to research the concrete component 2 when the crack initiation process develops slowly under a controlled loading rate. Exemplarily, each of three visible light imaging devices of the visible light imaging device group 5 in FIG. 13 is the high-speed camera, or each of the three visible light imaging devices of the visible light imaging device group 5 in FIG. 13 is the high-definition camera.

The computer control system 6 is connected to the fluorescent solution spraying device 3, the UV lamp group 4 and the visible light imaging device group 5. The computer control system 6 is configured to control turning-on and turning-off of the fluorescent solution spraying device 3, the UV lamp group 4 and the visible light imaging device group 5, serve as a human-computer interaction interface to splice fields of view of respective visible light imaging devices of the visible light imaging device group 5 into a whole, and visually display the crack initiation process of the cracks marked by fluorescence (i.e., fluorescent excitation solution) on the observation surface of the concrete component 2.

The rapid real-time visualization system is used to perform a rapid real-time visualization method for the crack initiation process of the concrete component 2, the rapid real-time visualization method includes following steps.

(1) Test Preparation

Firstly, the concrete component 2 is selected as a research carrier for a crack initiation process test based on a research purpose, the concrete component 2 is placed into the pressure test machine 1, and a cracking load of the concrete component 2 is estimated. A basis for estimating the cracking load can be found in "Design Specification for Hydraulic Concrete Structures", which is based on the shape, size, strength, and loading form of concrete components. If the concrete component 2 is a reinforced concrete component, sizes of rebars also need to be considered for determination.

Secondly, the fluorescent excitation solution (i.e., mixed solution with a weight ratio of potassium carbonate:a water-soluble fluorescent yellow reagent:distilled water of 80:100: 0.5), and the fluorescent solution spraying device 3 is connected to the computer control system 6. The observation surface of the concrete component 2 is determined, the UV lamps (60 W, a wavelength of 365 nm) of the UV lamp group 4 are placed at equal intervals and at a distance of 1.5 m from the concrete component 2, allowing each UV lamp of the UV lamp group 4 to project each UV light directly onto the observation surface of the concrete component 2, the UV lights projected by the UV lamps of the UV lamp group 4 can fully cover the observation surface of the concrete component 2, and the UV lamp group 4 is connected to the computer control system 6 to control the turning-on and turning-off of the UV lamp group 4 through the computer control system 6.

Finally, the visible light imaging device group 5 is placed at a distance of 1.0 m-1.5 m from the concrete component 2 at equal intervals, an observation length of the concrete component 2 in the field of view of each visible light imaging device of the visible light imaging device group 5 is not greater than 1 m, a combination of the fields of view of the visible light imaging devices exactly covers the concrete component 2, and a length of the concrete component 2 in the field of view of each visible light imaging device is same. The visible light imaging device group 5 is connected to the computer control system 6 to control the turning-on and turning-off of the visible light imaging device group 5 through the computer control system 6, splice the fields of view of the visible light imaging devices of the visible light imaging device group 5 into a whole, and visually display the crack initiation process of the cracks marked by fluorescence on the observation surface of the concrete component 2.

(2) A thickness of 0.002 mm of RUNFK (a hardware tool brand with products including lubricants, cutting fluids and engine oils etc.) fast-drying rust preventive oil is evenly coated to the observation surface of the concrete component 2, making the observation surface of concrete component 2 wetted.

(3) The computer control system 6 activates the fluorescent solution spraying device 3 to spray the fluorescent excitation solution to the fluorescent solution retention layer until the fluorescent excitation solution adheres evenly to the fluorescent solution retention layer and reaches a critical state where the fluorescent excitation solution is about to flow vertically along the observation surface of concrete component 2.

(4) The computer control system 6 activates the UV lamp group 4 to project the UV lights onto the observation surface of the concrete component 2 to make the UV lights fully cover the observation surface of the concrete component 2.

(5) The pressure test machine 1 is activated to apply the pressure load to the concrete component 2, simultaneously the computer control system 6 activates the visible light imaging device group 5 to record a video of a crack initiation process on the observation surface of the concrete component 2 and splice the fields of view recorded by the visible light imaging devices of the visible light imaging device group 5 into a whole for complete visualization of the observation surface of the concrete component 2.

(6) The crack initiation process of the observation surface of the concrete component 2 is monitored by a monitor of the computer control system 6. The computer control system 6 automatically outlines a microcrack on the monitor for manual confirmation and emits an alert sound, when the microcrack meets microcrack determination criteria in crack propagation. The microcrack should simultaneously meet the microcrack determination criteria including a first criterion (1) and a second criterion (2), or the first criterion (1) and a third criterion (3). The first criterion (1) is that a dark band appears around the microcrack on the observation surface because the microcrack absorbs the fluorescent excitation solution, and an adsorption effect of the microcrack on the fluorescent excitation solution is enhanced, resulting in the dark band wider than 1.5 mm, due to a lubricating effect of the fluorescent solution retention layer on the observation surface. The second criterion (2) is that a crack-shaped dark band first appears on a tensile side of the concrete component 2 and then extends towards a compressive side of the concrete component 2. The third criterion (3) is that there is a crack-shaped dark band perpendicular to a compression direction of the concrete component 2, due to mutual attractions during the development process of the cracks and a situation where the cracks interconnect and develop with each other.

(7) The computer control system 6 activates the fluorescent solution spraying device 3 to perform supplemental spraying to a tip of the microcrack along a crack propagation direction of the microcrack after manually confirming the microcrack, and perform intermittent supplementary spraying every 10 minutes to an area on the observation surface where the supplemental spraying is not performed from an end of the spraying in the step (3).

(8) The step S6 and S7 are repeated during a load applied process to the concrete component 2 until the crack initiation process of the concrete component 2 is completed, the computer control system 6 turns off the visible light imaging device group 5 and the UV lamp group 4, and a visual analysis and detection of the crack initiation process is achieved by reviewing the video. Specific test results are shown in FIG. 1 to FIG. 12.

Figure 11:
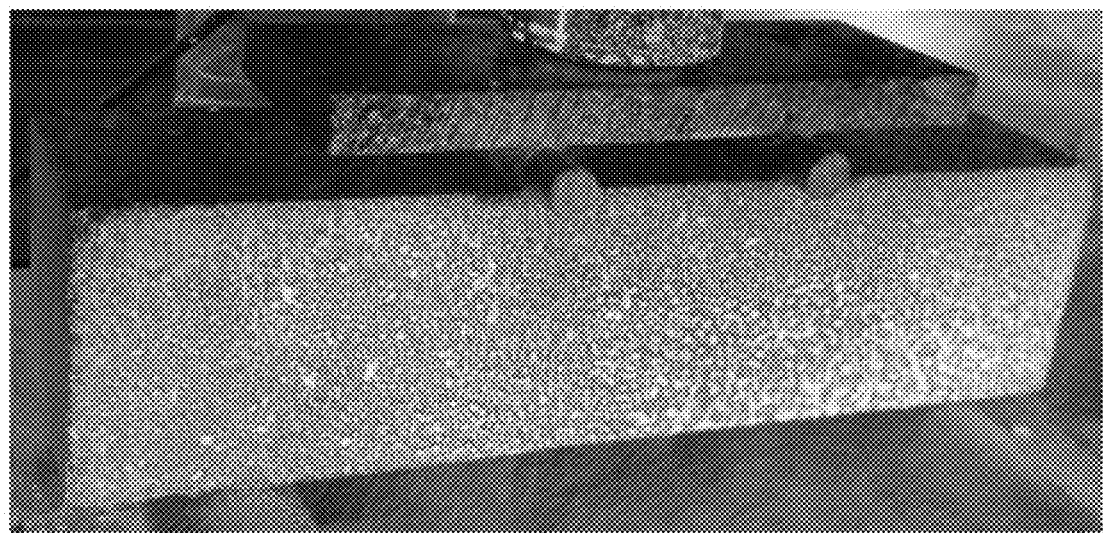
FIG. 11 illustrates a fluorescence effect morphology diagram after initial spraying and before applying a load.

FIG. 11 illustrates a fluorescence effect morphology diagram of the concrete component 2 after initial spraying (i.e., the spraying in the step (3)) and before applying the pressure load. The results in FIG. 11 show an initial state of the reinforced concrete component 2 after uniformly coating the fluorescent solution retention layer and spraying the fluorescent excitation solution and before applying the pressure load. The observation surface of the concrete component 2 is uniformly covered with the fluorescent excitation solution.

Figure 1:
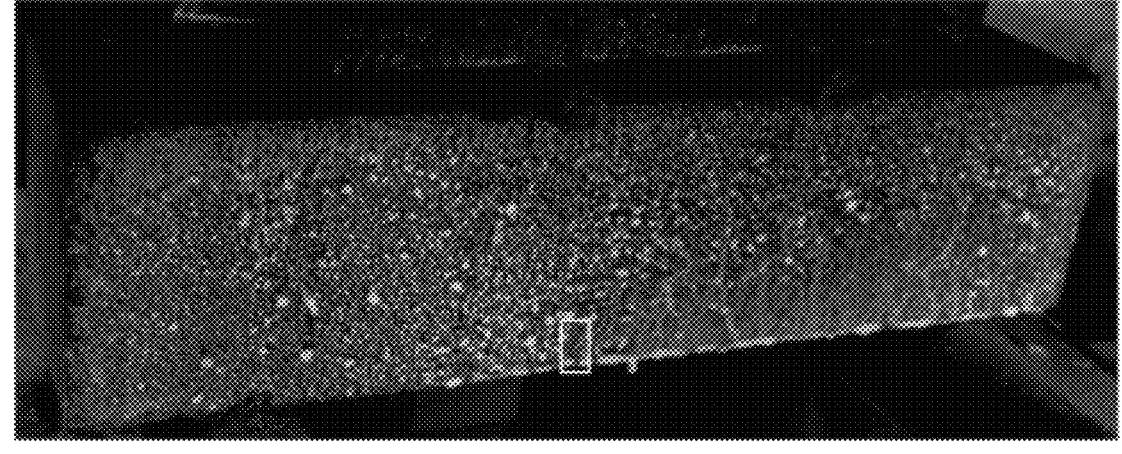
FIG. 1 illustrates a first fluorescence morphology diagram of a multi-point crack initiation process.
Figure 2:
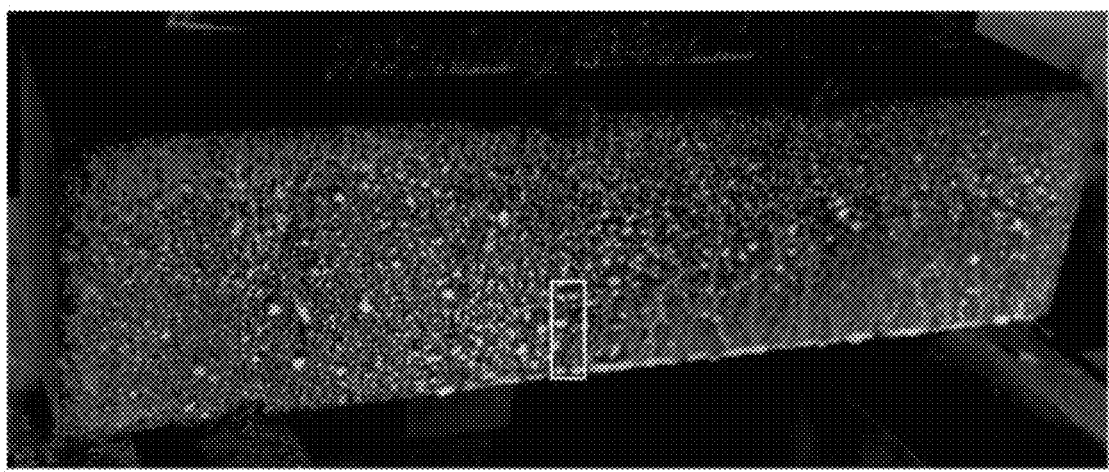
FIG. 2 illustrates a second fluorescence morphology diagram of the multi-point crack initiation process.
Figure 3:
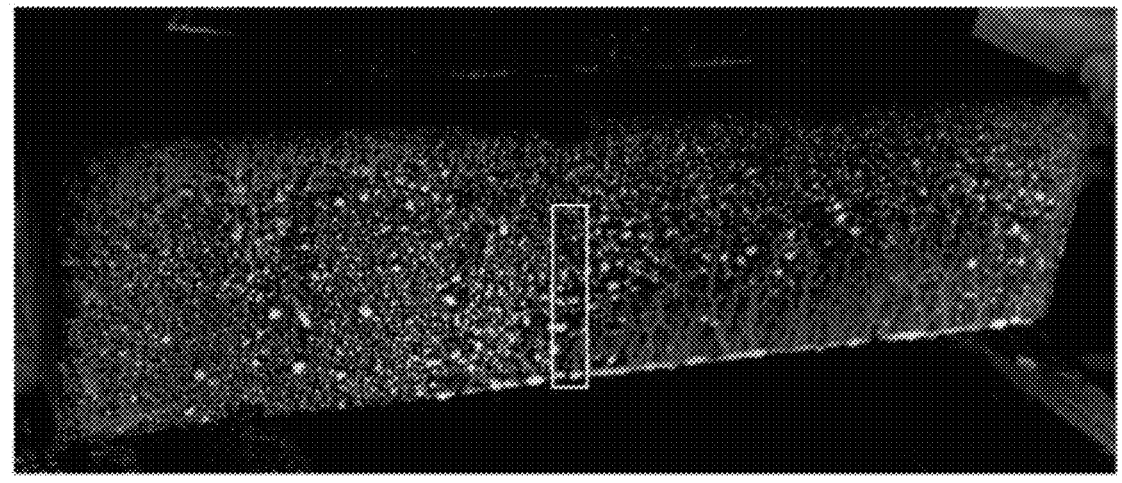
FIG. 3 illustrates a third fluorescence morphology diagram of the multi-point crack initiation process.
Figure 4:
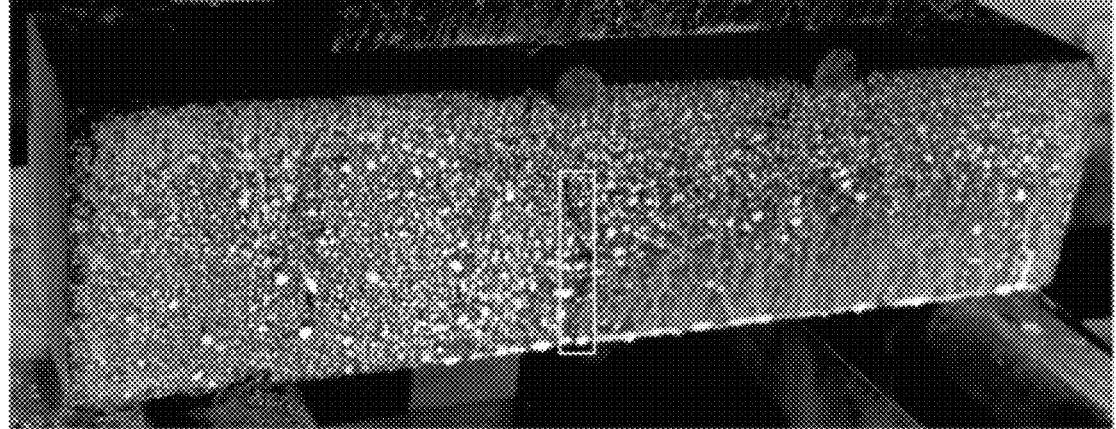
FIG. 4 illustrates a fourth fluorescence morphology diagram of the multi-point crack initiation process.
Figure 5:
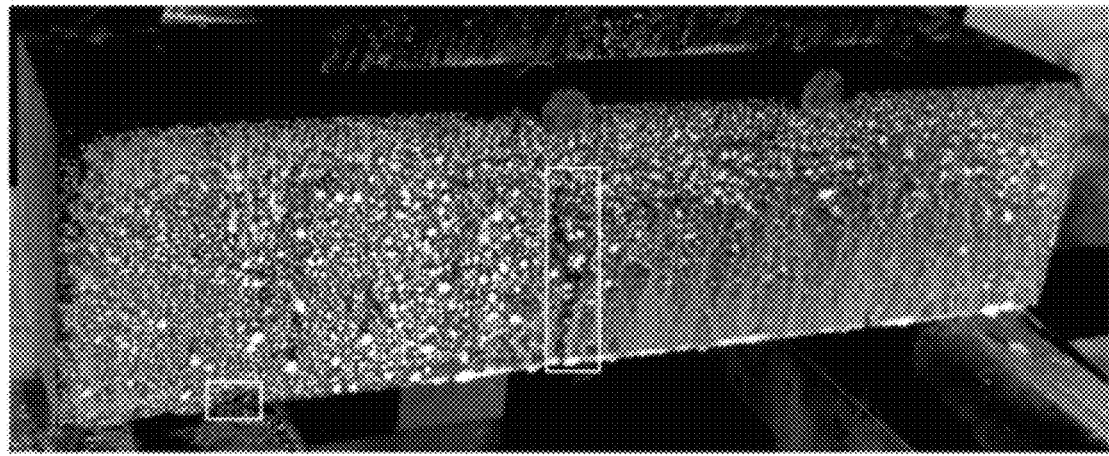
FIG. 5 illustrates a fifth fluorescence morphology diagram of the multi-point crack initiation process.
Figure 6:
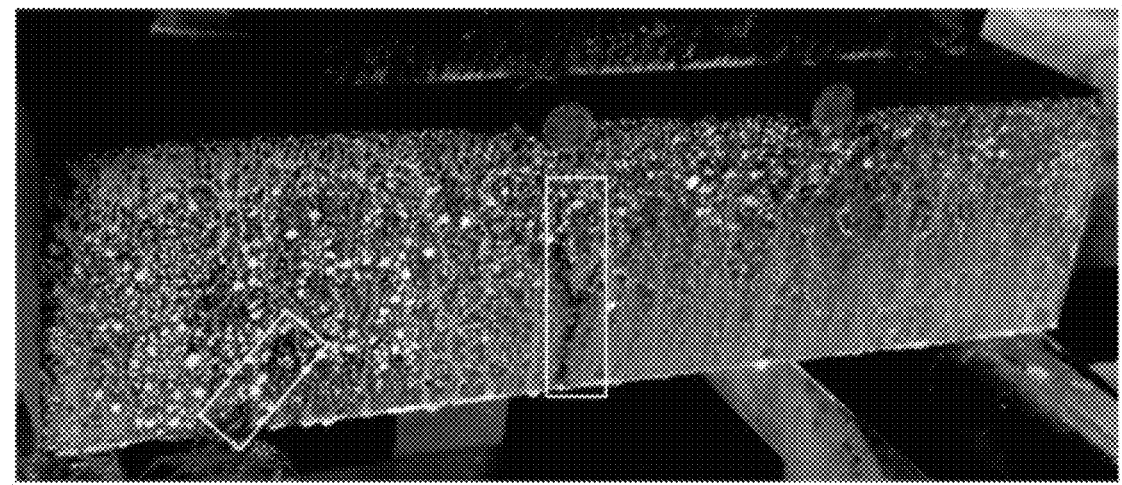
FIG. 6 illustrates a sixth fluorescence morphology diagram of the multi-point crack initiation process.
Figure 7:
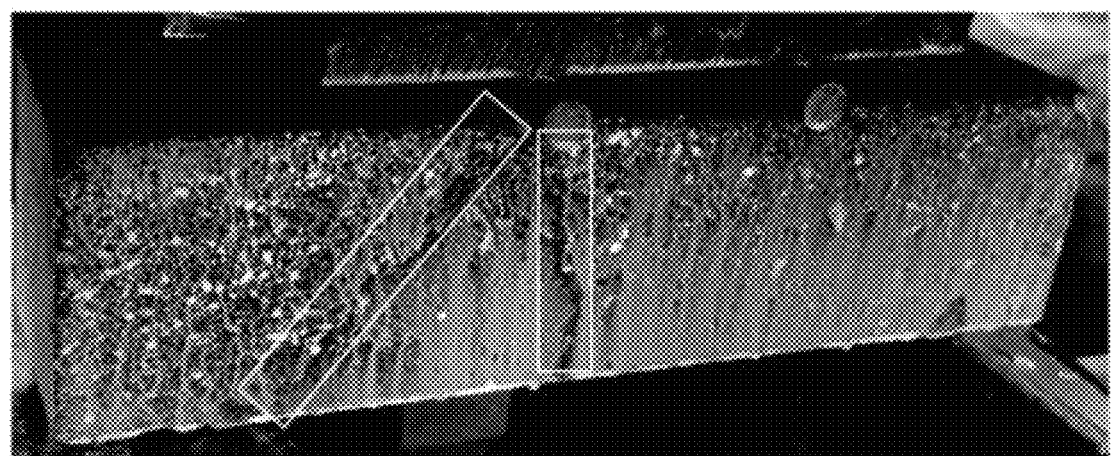
FIG. 7 illustrates a seventh fluorescence morphology diagram of the multi-point crack initiation process.
Figure 8:
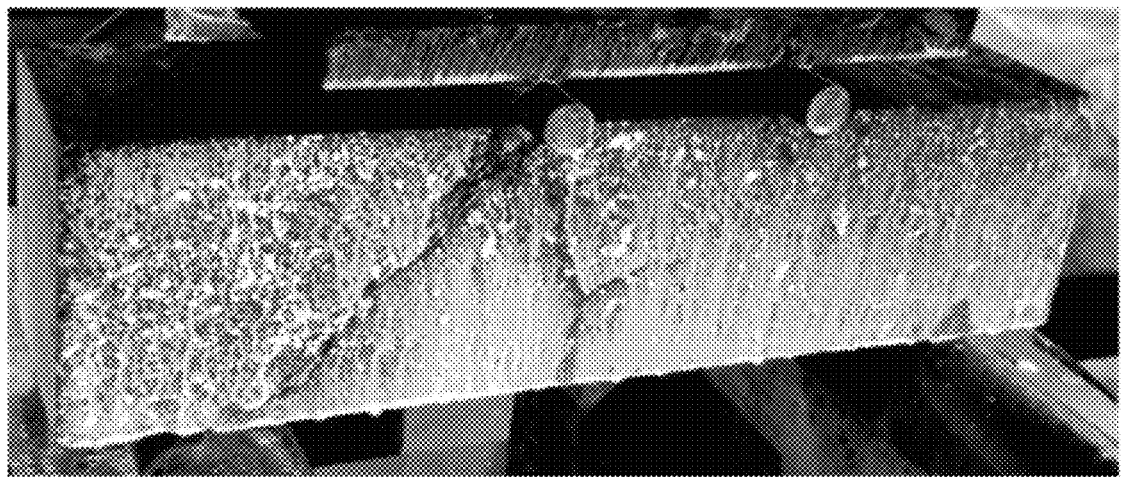
FIG. 8 illustrates an eighth fluorescence morphology diagram of the multi-point crack initiation process.
Figure 9:
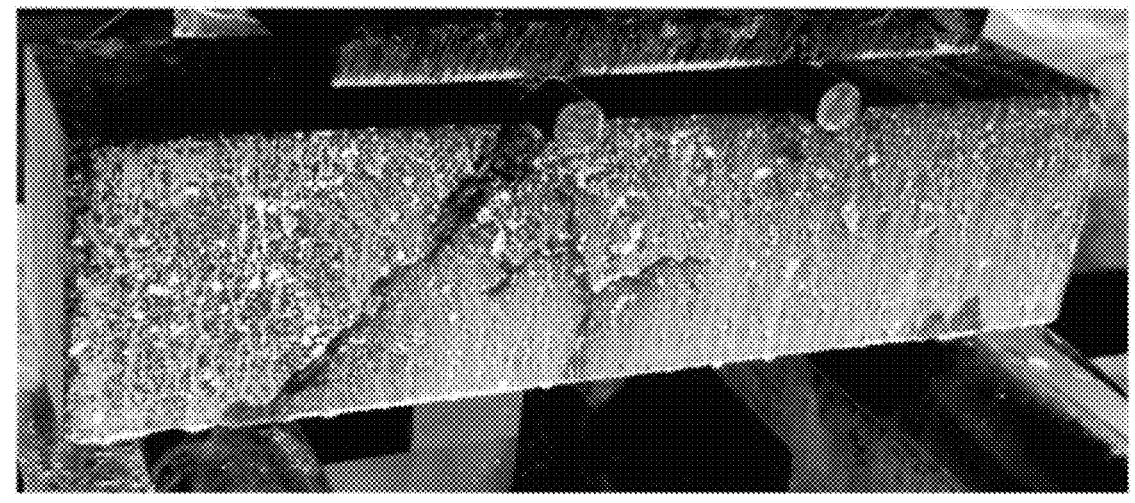
FIG. 9 illustrates a ninth fluorescence morphology diagram of the multi-point crack initiation process.
Figure 10:
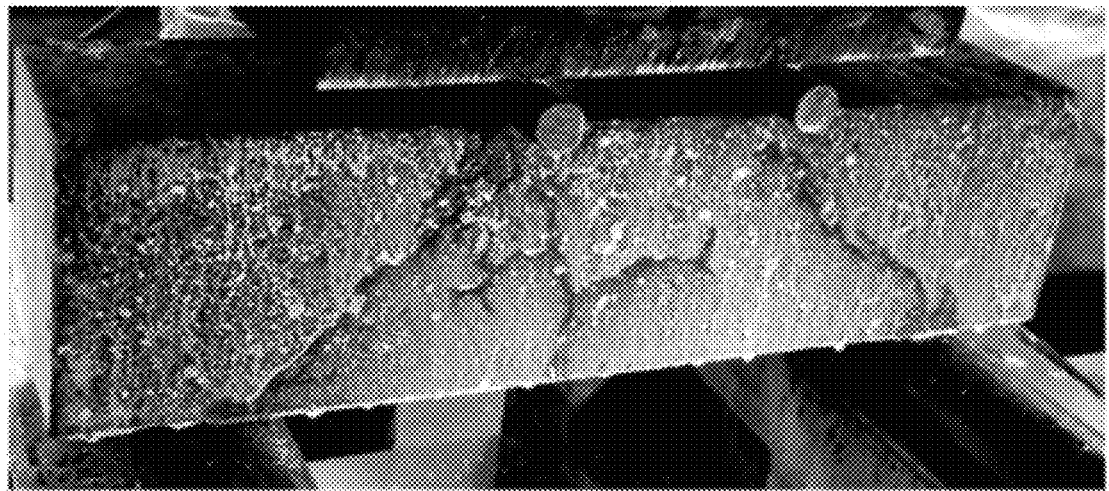
FIG. 10 illustrates a tenth fluorescence morphology diagram of the multi-point crack initiation process.

As shown in FIG. 1 to FIG. 4, during the load applied process, it can be observed through the monitor of the computer control system 6 that the concrete component 2 cracks first at a bottom of a mid-span, and a first crack extends along a height direction of the concrete component 2. With an increase of the pressure load, a width of the first crack gradually increases, and color of a dark band of the first crack on fluorescence images changes from light to dark. During this process, a propagation process of the first crack is visualized in real-time through a comprehensive application of the fluorescence excitation solution and UV radiation. During the propagation process of the first crack, a slight bifurcation occurs and a second microcrack sprouted at a bottom of the concrete component 2 at a left support, as shown in FIG. 5. As the pressure load continues to increase, a second crack can be observed to develop diagonally along the height direction of the concrete component 2, as shown in FIG. 6 to FIG. 8. Along with the diagonal development of the second crack, the first crack appears to develop horizontally perpendicular to a loading direction, as shown in FIG. 9. As the pressure load continues, a third crack diagonally appeared at the bottom of the concrete component 2 at a right support, as shown in FIG. 10.

Figure 12:
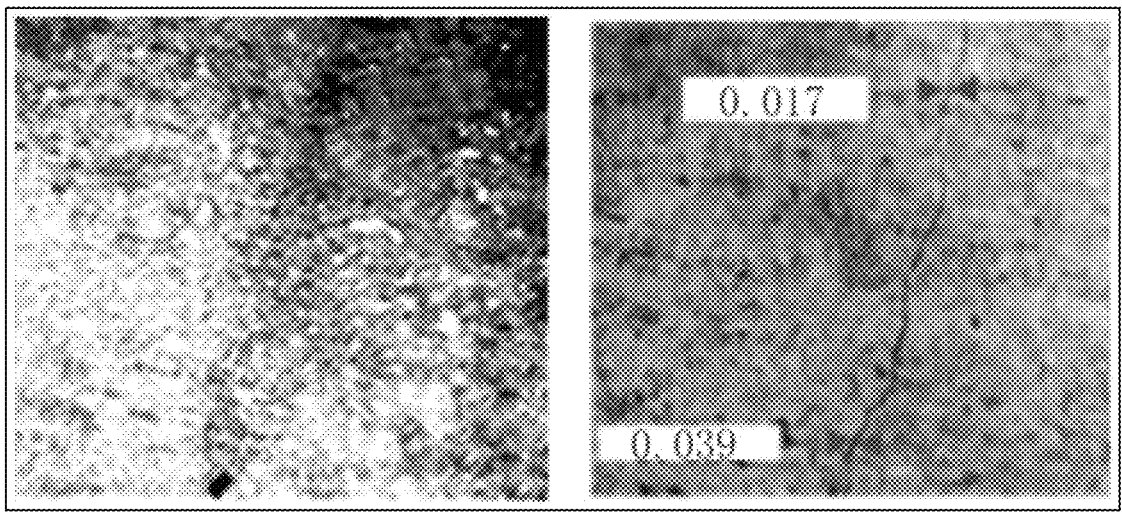
FIG. 12 illustrates a schematic diagram of the fluorescence excitation effect and respective width of a crack with a minimum width.

FIG. 12 illustrates a schematic diagram of the fluorescence excitation effect and respective width of a crack with a minimum width. As shown in FIG. 12, a dark band of the crack is marked by fluorescence excitation under the UV radiation, after measuring the crack with a crack measuring instrument, it is found that the minimum width of the crack marked by the dark band is 0.017 mm.

The disclosure is not limited by the embodiments mentioned above. Any apparent amendments or modifications made by those skilled in the art without creative labor shall not depart from the spirit and scope of the disclosure.

What is claimed is:

1. A rapid real-time visualization method for a crack initiation process of a concrete component implemented through a visualization system, the visualization system comprising: a pressure test machine, a fluorescent solution spraying device, an ultraviolet (UV) lamp group, a visible light imaging device group, and a computer control system; wherein the fluorescent solution spraying device is configured to spray fluorescent excitation solution evenly to an observation surface of the concrete component, the pressure test machine is configured to apply a pressure load to the concrete component to crack the concrete component, the UV lamp group is configured to project UV lights onto the observation surface of the concrete component, with the UV lights projected by respective UV lamps of the UV lamp group fully covering the observation surface of the concrete component, the visible light imaging device group is configured to record a development process of cracks marked by the fluorescent excitation solution on the observation surface of the concrete component, the computer control system is connected to the fluorescent solution spraying device, the UV lamp group, and the visible light imaging device group, the computer control system is configured to control turning-on and turning-off of the fluorescent solution spraying device, the UV lamp group, and the visible light imaging device group, serve as a human-computer interaction interface to splice fields of view of respective visible light imaging devices of the visible light imaging device group into a whole, and visually display a crack initiation process of the cracks marked by the fluorescent excitation solution on the observation surface of the concrete component;

the rapid real-time visualization method comprises following steps:

S1, selecting the concrete component as a research carrier for a crack initiation process test based on a research purpose, placing the concrete component into the pressure test machine, and estimating a cracking load of the concrete component;

S2, determining the observation surface of the concrete component in the crack initiation process of the concrete component, and evenly coating a fluorescent solution retention layer to the observation surface to make the observation surface of the concrete component wetted;

S3, activating, by the computer control system, the fluorescent solution spraying device to spray the fluorescent excitation solution to the fluorescent solution retention layer until the fluorescent excitation solution adheres evenly to the fluorescent solution retention layer and reaches a critical state where the fluorescent excitation solution is about to flow vertically along the fluorescent solution retention layer;

S4, activating, by the computer control system, the UV lamp group to project the UV lights onto the observation surface of the concrete component to make the UV lights fully cover the observation surface of the concrete component;

S5, activating the pressure test machine to apply the pressure load to the concrete component, and simultaneously, activating, by the computer control system, the visible light imaging device group to record a video of a crack initiation process on the observation surface of the concrete component;

S6, monitoring, by a monitor of the computer control system, the crack initiation process on the observation surface of the concrete component, wherein the computer control system automatically outlines a microcrack on the monitor for manual confirmation and emits an alert sound, when the microcrack meets microcrack determination criteria in crack propagation;

S7, activating, by the computer control system, the fluorescent solution spraying device to perform supplemental spraying to a tip of the microcrack along a crack propagation direction of the microcrack after manually confirming the microcrack, and perform intermittent supplementary spraying to an area on the observation surface where the supplemental spraying is not performed from an end of the spraying; and S8, repeating the step S6 and S7 during a load applied process to the concrete component until the crack initiation process of the concrete component is completed, turning off, by the computer control system, the visible light imaging device group and the UV lamp group, and achieving a visual analysis and detection of the crack initiation process by reviewing the video.

2. The rapid real-time visualization method for the crack initiation process of the concrete component as claimed in claim 1, wherein the fluorescent solution retention layer is configured to separate the fluorescent excitation solution from the concrete component, a thickness of the fluorescent solution retention layer is not greater than 0.002 millimeters (mm), allowing the fluorescent excitation solution to adhere to the fluorescent solution retention layer over 300 seconds, and the fluorescent solution retention layer is capable of cracking synchronously with the cracks on the observation surface without covering the cracks when an initial crack width is in a range of 0.01 mm-0.02 mm, and a material of the fluorescent solution retention layer comprises fast-drying rust preventive oil.

3. The rapid real-time visualization method for the crack initiation process of the concrete component as claimed in claim 1, wherein in the step S3, the fluorescent excitation solution is obtained by mixing potassium carbonate, a water-soluble fluorescent yellow reagent, and distilled water, a weight ratio of the potassium carbonate: the water-soluble fluorescent yellow reagent: the distilled water is 75-95: 100:0.4-0.7.

4. The rapid real-time visualization method for the crack initiation process of the concrete component as claimed in claim 1, wherein in the step S4, a wavelength of each UV light is 365 nanometers (nm), a density of the UV lights projected to the observation surface of the concrete component is in a range of 2000 microwatts per square centimeter ($\mu$w/cm$^2$) to 8000 $\mu$w/cm$^2$.

5. The rapid real-time visualization method for the crack initiation process of the concrete component as claimed in claim 1, wherein in the step S5, in the load applied process to the concrete component, when the pressure load is applied to 80% of an estimated cracking load, a loading displacement rate is reduced to 0.02-0.1 millimeters per minute (mm/min).

6. The rapid real-time visualization method for the crack initiation process of the concrete component as claimed in claim 1, wherein in the step S5, the visible light imaging device group is located at a distance of 1.0-1.5 meters (m) from the observation surface of the concrete component, an observation length of the concrete component in the field of view of each visible light imaging device of the visible light imaging device group is not greater than 1 m, the visible light imaging devices are arranged at equal intervals, a combination of the fields of view of the visible light imaging devices exactly covers the concrete component, and a length of the concrete component in the field of view of each visible light imaging device is same.

7. The rapid real-time visualization method for the crack initiation process of the concrete component as claimed in claim 1, wherein the visible light imaging device group comprises a high-speed camera and a high-definition camera, the high-speed camera is configured to meticulously research the concrete component when the crack initiation process develops rapidly, a resolution of the high-speed camera is not less than 4 million pixels, a shooting speed of the high-speed camera is not less than 1440 frames per second, the high-definition camera is configured to research the concrete component when the crack initiation process develops slowly under a controlled loading rate, and a resolution of the high-definition camera is not less than 10 million pixels.

8. The rapid real-time visualization method for the crack initiation process of the concrete component as claimed in claim 1, wherein the microcrack should simultaneously meet the microcrack determination criteria comprising a first criterion and a second criterion, or the first criterion and a third criterion; the first criterion is that a dark band appears around the microcrack on the observation surface because the microcrack absorbs the fluorescent excitation solution, and an adsorption effect of the microcrack on the fluorescent excitation solution is enhanced, resulting in the dark band wider than 1.5 mm, due to a lubricating effect of the fluorescent solution retention layer on the observation surface, the second criterion is that a crack-shaped dark band first appears on a tensile side of the concrete component and then extends towards a compressive side of the concrete component, the third criterion is that there is a crack-shaped dark band perpendicular to a compression direction of the concrete component, due to mutual attractions during the development process of the cracks and a situation where the cracks interconnect and develop with each other.

9. The rapid real-time visualization method for the crack initiation process of the concrete component as claimed in claim 1, wherein in the step S7, a time interval of the intermittent supplementary spraying is in a range of 10-15 minutes.

* * * * *